United States Patent [19]

Wilkins et al.

[11] Patent Number: 5,108,592

[45] Date of Patent: * Apr. 28, 1992

[54] ROTARY SELF-CLEANING STRAINER SIMULTANEOUSLY CLEANED AND ROTATED BY NOZZLE STRUCTURE

[75] Inventors: Thomas R. Wilkins; Charles A. Wilkins; James O. Stoneburner, all of Ann Arbor, Mich.

[73] Assignee: Perfection Sprinkler Co., Ann Arbor, Mich.

[*] Notice: The portion of the term of this patent subsequent to Apr. 18, 2006 has been disclaimed.

[21] Appl. No.: 506,692

[22] Filed: Apr. 9, 1990

[51] Int. Cl.⁵ .............................................. B01D 33/073
[52] U.S. Cl. ................................. 210/107; 210/155; 210/161; 210/232; 210/409; 210/460; 210/338; 239/723; 405/43
[58] Field of Search ................ 210/156, 157, 158, 161, 210/170, 338, 354, 394, 409, 416.1, 107, 412, 460, 499, 232, 155, 403; 405/36, 43; 239/723–725, DIG. 23

[56] References Cited

U.S. PATENT DOCUMENTS

| 2,646,888 | 7/1953 | Schichtl | 210/161 |
|---|---|---|---|
| 3,242,872 | 3/1966 | Thompson | 210/158 |
| 4,045,345 | 8/1977 | Drori | 210/107 |
| 4,053,413 | 10/1977 | Miller | 210/161 |
| 4,261,822 | 4/1981 | Richardson | 210/161 |
| 4,271,018 | 6/1981 | Drori | 210/107 |
| 4,317,539 | 3/1982 | Pollock | 210/170 |
| 4,626,129 | 12/1986 | Kothmann et al. | 405/36 |
| 4,655,910 | 4/1987 | Tabor | 210/107 |
| 4,822,486 | 4/1989 | Wilkins et al. | 210/460 |

FOREIGN PATENT DOCUMENTS

| 2519566 | 7/1983 | France | 210/409 |
|---|---|---|---|
| 1034660 | 8/1983 | U.S.S.R. | 239/723 |

Primary Examiner—Robert A. Dawson
Assistant Examiner—Joseph Drodge
Attorney, Agent, or Firm—George L. Boller

[57] ABSTRACT

A rotary self-cleaning strainer comprises a circular cylindrical walled pipe on which a circular cylindrical filter screen assembly is journaled for rotation. The pipe has an intake that is surrounded by the filter screen assembly and a discharge that is connected to a pump. When the strainer is placed in a body of water that is to be pumped, water is drawn through the screen that forms the sidewall of the filter screen assembly and enters the intake of the pipe. The filtered water is conducted through the PVC pipe and to the pump. Two sets of nozzles disposed within the filter screen assembly are supplied with return water through a supply line tapped into the pump outlet. The water is forcefully emitted against the screen to both rotate the screen assembly and dislodge adhering debris from the exterior of the screen. Each set of nozzles is 180 degrees from the other so that each acts upon a limited zone of the screen. The use of two nozzle sets enables the strainer to be effective in certain existing systems without having to increase the water pressure to be strained beyond the prevailing system pressure.

10 Claims, 4 Drawing Sheets

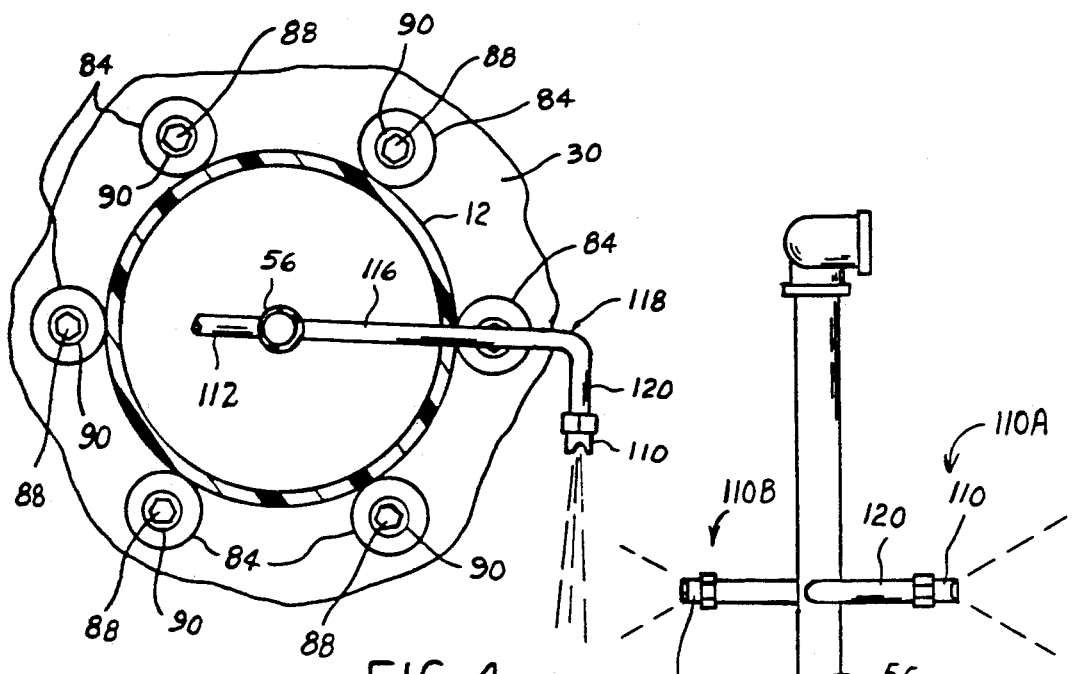
FIG. 4
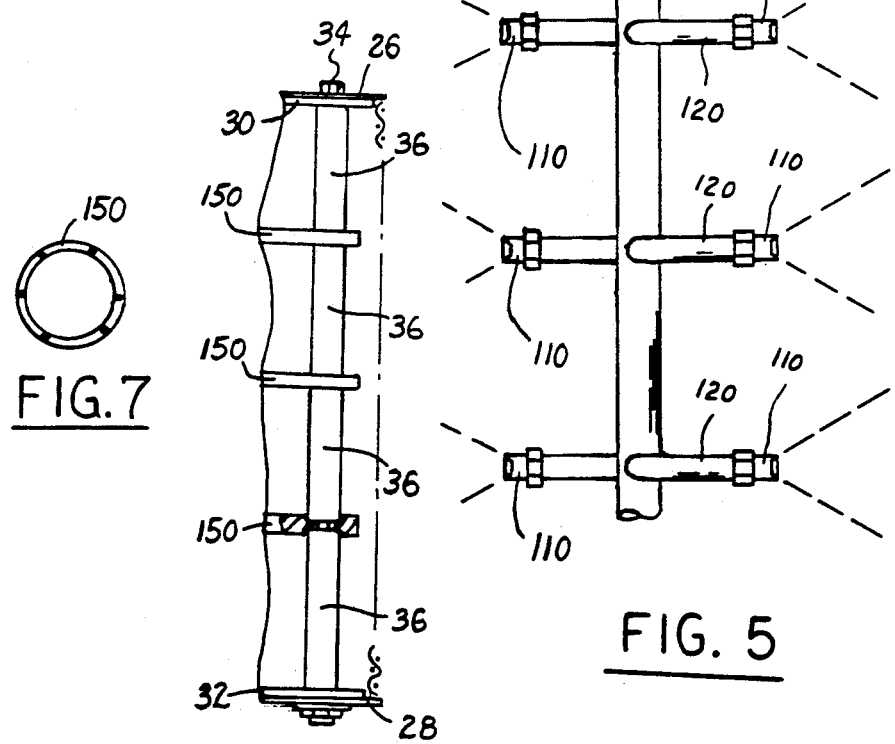
FIG. 7
FIG. 6
FIG. 5

ROTARY SELF-CLEANING STRAINER SIMULTANEOUSLY CLEANED AND ROTATED BY NOZZLE STRUCTURE

BACKGROUND AND SUMMARY OF THE INVENTION

When water is to be pumped out of an outdoor pit, reservoir, or canal, it is important to prevent debris, such as leaves, sticks, discarded plastic and paper articles, stones, etc., from entering the pump. Rotary self-cleaning strainers that contain cylindrical screens for performing the straining function are often used for this purpose.

The strainer is attached to the end of a conduit and immersed in the body of water that is to be pumped. The pump is operated to suck water through the strainer and conduit, as the strainer screen prevents debris from being sucked into the conduit along with the water. Certain debris may adhere to the screen's exterior due to the pump suction force. However, the continued adherence of such debris to the screen's exterior, and resulting impairment of flow through the screen, is prevented by rotating the screen past a nozzle structure which is disposed on the interior of the screen and directs water outwardly through the screen to dislodge the debris. The water is fed under pressure to the strainer through a separate supply line which may be tapped into the pump's outlet. The water acts on only a limited circumferential zone of the screen at any given time to force adhering debris away from the exterior of the screen as the screen revolves past the nozzle structure. The remainder of the screen serves to conduct the flow of liquid that is being pumped out of the pit or reservoir through the screen and into the conduit.

The inventors, commonly assigned U.S. Pat. No. 4,822,486 issued Apr. 18, 1989, discloses a new and improved rotary self-cleaning strainer of this general type. The patented strainer possesses a number of novel and unique features which individually and collectively constitute the improvements. One feature relates to the manner in which the nozzle structure that performs the self-cleaning function is organized and arranged in assembly with other component parts to impart rotation to the screen.

Some aspects of the present invention relate to improvements which are specific to the invention of U.S. Pat. No. 4,822,486; other aspects to improvements which are applicable to rotary self-cleaning strainers that do not necessarily embody the invention of U.S. Pat. No. 4,822,486.

The present invention arises in consequence of the recognition that certain existing irrigation systems which could benefit from the use of the patented strainer lack pumps of sufficient delivery pressure for securing the most effective usage of the patented strainer, and that for any of a number of different reasons, adaptation of these systems to provide higher pressures for operating the patented strainer in systems is often improbable. For example, a typical crop irrigation system falling into this category may comprise an extensive network of irrigation conduit laid out over a vast expanse of cultivated land. Water is pumped out of available sources of supply, such as irrigation canals, and delivered through the distribution network to the cultivated land. Although such a system may be capable of delivering large volumes of water, the system pressure may be too low for the most effective operation of the patented strainer. In order to adapt such a system for most effectively using the patented strainer, it is necessary to provide higher pressure such as by replacing existing pumps by higher pressure ones, or by adding separate boost pumps. Accordingly, the owners of such systems may be deprived of the benefits that can be obtained through the use of the patented strainer if they are not in a position to make rather major changes to their existing installations.

The present invention is directed to improvements in rotary self-cleaning strainers for the purpose of enabling a strainer of the type disclosed in U.S. Pat. No. 4,822,486 to be most effectively used in certain irrigation applications without the need to augment the existing water pressure in these systems. Briefly, the present invention comprises the modification of the patented strainer in such a way that comparable screen cleaning action can be accomplished at lower pressures.

When the patented strainer is operated at less than intended pressure, the reduced force directed from the nozzles against the screen has a compound effect: 1) the rotational speed of the screen is reduced; and 2) the force for dislodging debris from the screen is also reduced. Hence, a given area of the screen is cleaned less frequently, thereby, allowing more debris to be adhered at any given time, and only lower impact forces are available for dislodging the accumulated debris from the screen.

The present invention provides a solution for avoiding these detrimental effects of reduced pressure operation and involves the addition of a second set of nozzles, 180 degrees from the first set and acting on the screen in the same sense as the first set of nozzles. Now, adhering debris can be dislodged twice as often even though the screen continues to turn at reduced speed. The reduced impact force of the water against the adhering debris is effective in dislodging the debris since there is less time for debris to accumulate on a given area of the screen between cleanings by a set of nozzles and, therefore, there should be less debris to dislodge, on the average. Thus, a screen embodying principles of the improvement of the present invention can be used for existing irrigation, or other pump-out requirements, without the necessity of making major modifications to existing hardware.

A further aspect of the invention arises in the context of situations where fine particulate materials must be filtered, in addition to a variety of larger forms of assorted debris. It has been discovered that replacing one screen by another may not be sufficient to provide the proper construction for enabling the screen to be both suitably rotated and cleaned by one or more sets of nozzles. This aspect of the invention comprises constructing the screen in the form of a perforated cylindrical sheet girdled by a fine mesh woven screen.

The foregoing features, advantages, and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

BRIEF DESCRIPTION OF THE DRAWINGS

FIG. 4 is a fragmentary transverse cross sectional view taken generally in the direction of arrows 4—4 in FIG. 1.

FIG. 5 is a fragmentary cross sectional view taken generally in the direction of arrows 5—5 in FIG. 1.

FIGS. 6 and 7 show certain details of an alternate construction.

DESCRIPTION OF THE PREFERRED EMBODIMENT

Figure 1:
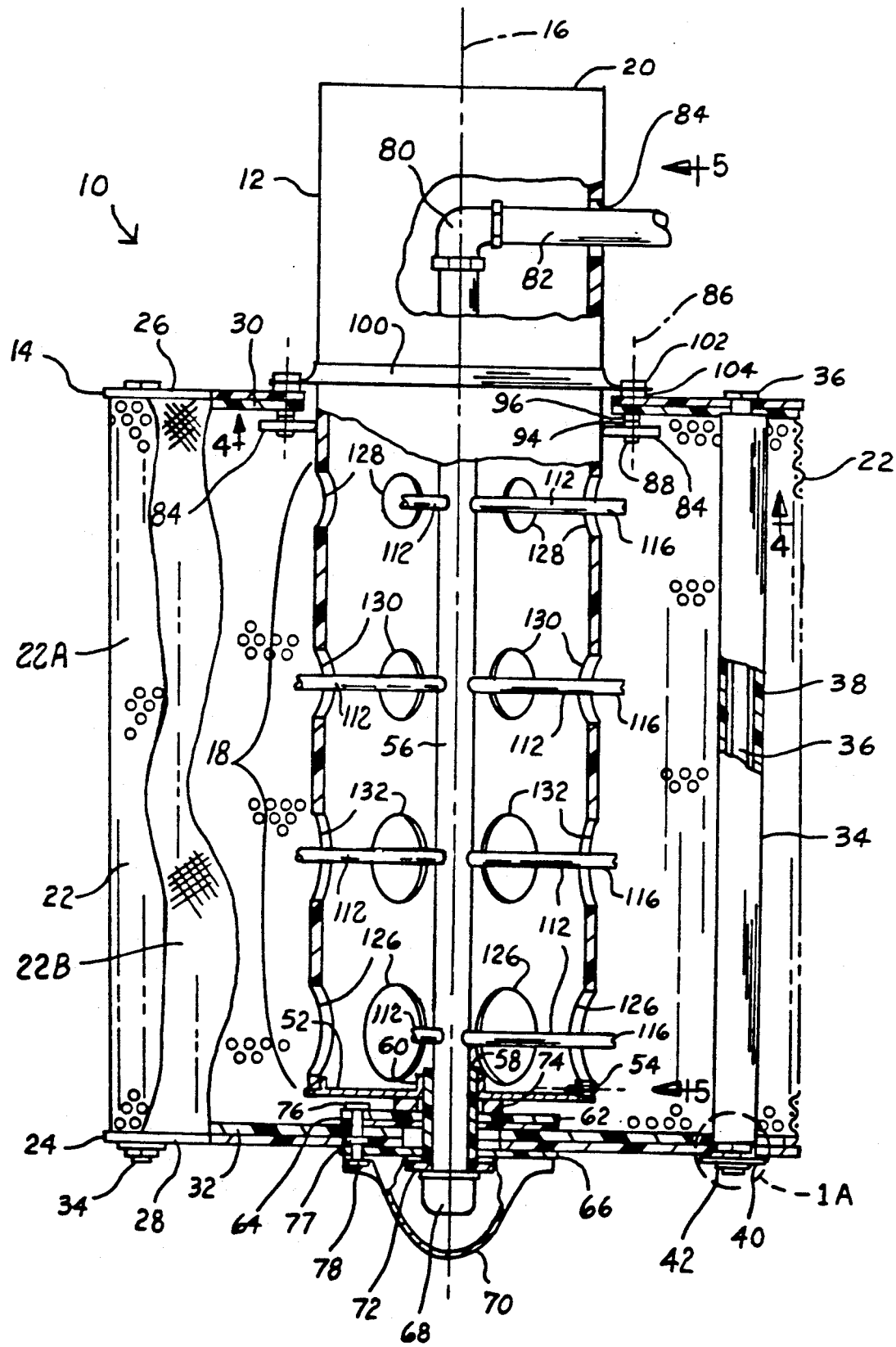
FIG. 1 is a longitudinal cross sectional view, having portions broken away, through a presently preferred embodiment of rotary self-cleaning strainer according to this invention.
Figure 2:
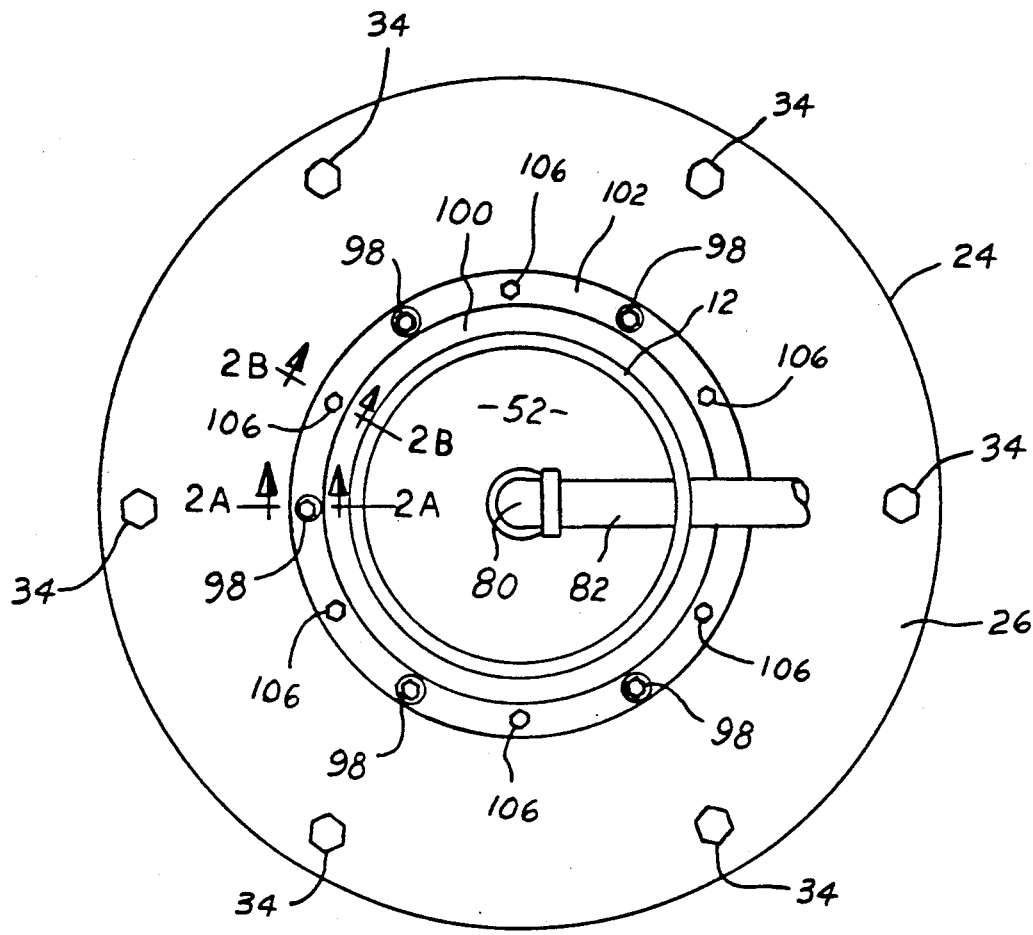
FIG. 2 is a full top plan view of the strainer of FIG. 1.
Figure 1A:
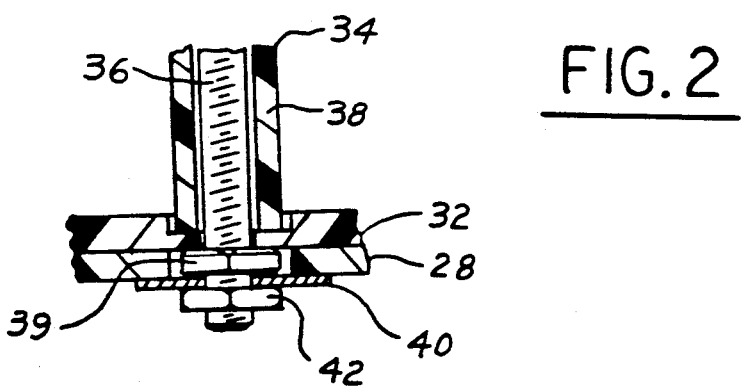
FIG. 1A is an enlarged sectional view in circle 1A of FIG. 1.
Figure 2A:
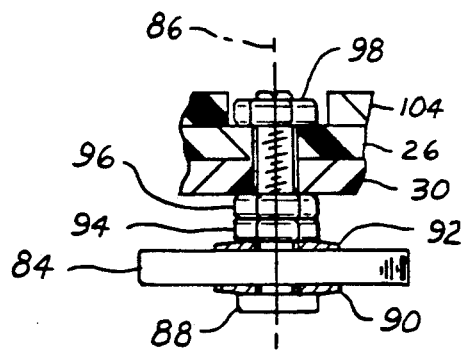
FIGS. 2A and 2B are enlarged fragmentary sectional views in the direction of arrows 2A—2A and 2B—2B respectively in FIG. 2.
Figure 3:
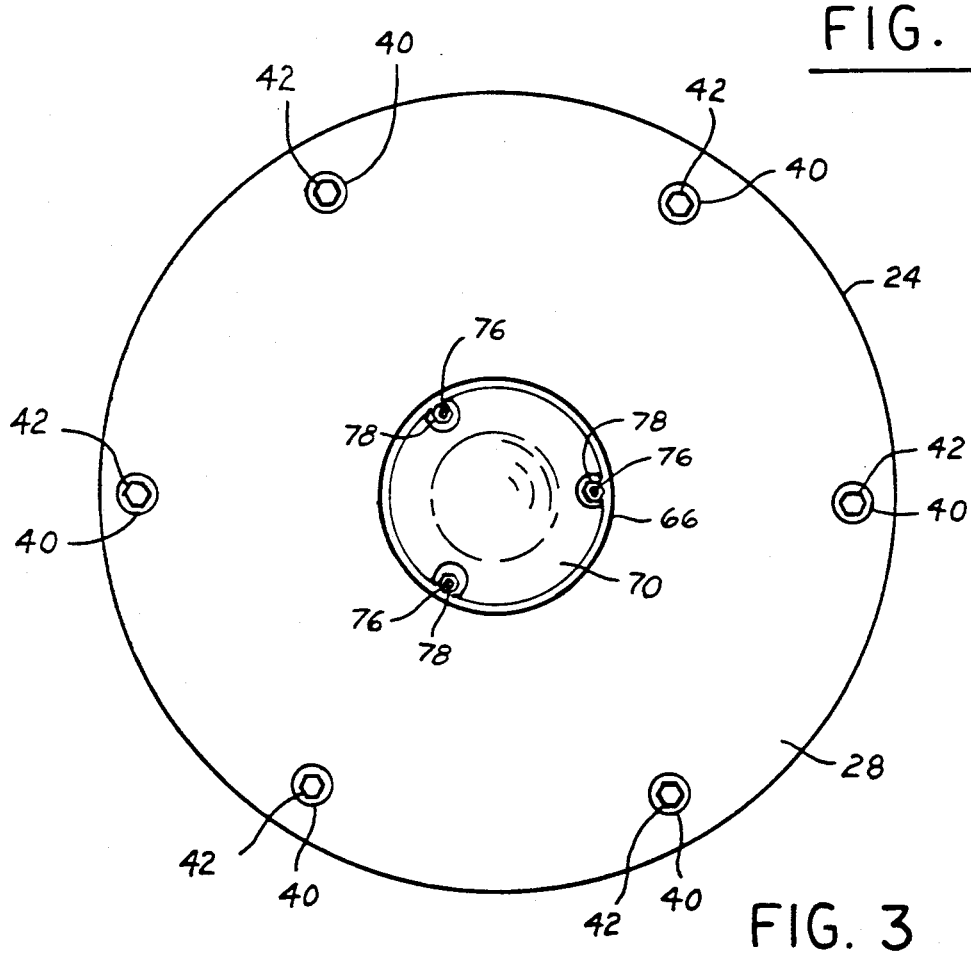
FIG. 3 is a full bottom plan view of the strainer of FIG. 1.
Figure 2B:
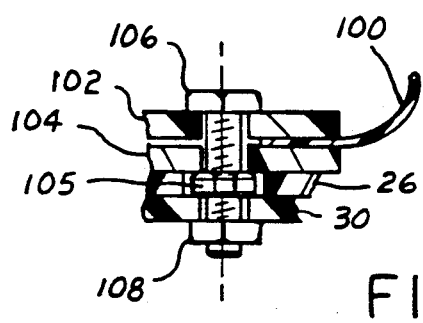

The drawing figures show a rotary self-cleaning strainer 10 that comprises a circular cylindrical walled pipe 12 and a circular cylindrical filter screen assembly 14. Pipe 12 and filter screen assembly 14 are coaxial about an axis 16 with filter screen assembly 14 being journaled for rotation on pipe 12 about axis 16.

Pipe 12 has an intake portion, 18 generally, and a discharge portion 20. The latter portion is adapted to be operatively connected to a pump such that when the pump is operated, the pump suction force is conducted through the interior of pipe 12 to intake portion 18. Intake portion 18 comprises a number of circular holes through the pipe sidewall arranged in a particular manner to be, hereinafter, described in greater detail.

Filter screen assembly 14 is arranged to enclose intake portion 18, and comprises a circular cylindrical screen portion 22 which is disposed in outwardly spaced relation to, but coaxial with, pipe 12. The specific details of screen portion 22 will be explained later.

Screen portion 22 is supported on a spool-like frame, 24 generally, that comprises two circular discs 26, 28 at opposite axial ends. The outside diameter of each disc 26, 28 is slightly larger than the outside diameter of screen 22. Two smaller circular discs 30, 32 ar disposed against the axially interior faces of discs 26, 28 respectively, and are of a diameter slightly less than the inside diameter of screen 22. As such, the two pairs of discs 26, 30 being one pair and 28, 32 the other pair, form respective circular shoulders for seating the respective axial ends of screen portion 22, and the disc pairs serve to close the open axial ends of the screen. The screen portion is sufficiently strong material that there need be no means for actually attaching the screen to the frame. In other words, the illustrated construction is sufficient to entrap the screen on frame 24 in substantially coaxial relationship to pipe 12.

A series of identical tie rod structures 34 serve to hold the two discs in spaced apart parallel relationship perpendicular to axis 16. Each tie rod structure 34 comprises a headed fastener 36 that is disposed parallel to axis 16 and whose shank passes through aligned holes in discs 26 and 28, and countersunk holes in discs 30 and 32. A cylindrical compression tube 38 has its ends seated in the countersunk portions of these holes in discs 30 and 32, and the shank of the fastener 36 passes through this tube. The distal end of fastener 36 is threaded. A first nut 39 is threaded onto the distal end of fastener 3 and tightened against disc 32, thereby, causing a compression force to be developed on tube 38 with the result that the disc pair 26, 30 and disc 32 are securely joined in assembly via the tie rod structure 34. The hole in disc 28 provides a cavity for nut 39 when disc 28 is disposed against disc 32. With disc 28 so disposed, a washer 40 and a second nut 42 are assembled onto the distal end of fastener 36, and nut 42 is tightened on the fastener, thereby, forcing disc 28 against disc 32 to provide a secure, but readily separable, joining of the two discs 28, 32 in assembled relationship. The illustrated embodiment of strainer comprises six tie rod structures 34, spaced at 60 degrees on a common circle around filter screen assembly 14 about axis 16. This arrangement provides for a convenient installation and removal of disc 28 by simply fastening and unfastening nuts 42, and as will become more apparent from further description later on, with disc 28 removed, screen portion 22 can be slid axially onto and off of the frame. This facilitates screen maintenance and/or replacement, if needed; it also provides for ready access to the interior of the frame and to components disposed therein.

The end closures formed by the respective disc pairs 26, 30 and 28, 32 contain respective structures for journaling and sealing filter screen assembly 14 on and with respect to pipe 12. The journaling and sealing of the lower end (as viewed in FIG. 1) of the filter screen assembly on pipe 12 is provided by the following structure. A circular annular end cap 52 is fitted and attached to the lower end of pipe 12. There are three points of attachment by fastener means 54 spaced 120 degrees apart around pipe 12. A length of a circular, cylindrical pipe 56 of considerably smaller diameter than pipe 12 passes coaxially through end cap 52. As will become more apparent from a later detailed description, this pipe 56 serves to supply water to the nozzle structure that cleans and rotates the screen assembly. A circular, cylindrical bushing 58 is disposed between pipe 56 and end cap 52, and a set screw 60 through the end cap is used to hold the bushing in place.

Bushing 58 has a length which extends beyond end cap 52 and through central circular clearance holes in the pair of discs 28, 32. Disposed against opposite axial faces of the disc pair 28, 32 are circular annular discs 62, 64, 66 forming a bearing within which bushing 58 has a close rotatable fit. The end of pipe 56 projects beyond this bearing and is closed by a pipe cap 68 threaded onto the pipe's end. This pipe cap is, in turn, enclosed by a dome-shaped cover 70. There are also two annular spacers 72, 74 disposed as shown.

Bearings 62, 64, 66 and cover 70 are secured in assembly on disc pair 28, 32 at three locations 120 degrees apart. At each location, the shank of a headed fastener 76 is passed through aligned holes in bearing discs 62, 64, discs 32, 28, bearing disc 66, and the outer margin of cover 70 that is disposed against the outer margin of bearing disc 66. The two bearings 62, 64 that are on the interior of assembly 14 are secured to disc 32 by threading nuts 77 onto the threaded distal end of each fastener 76 and tightening against disc 32. The aligned holes in disc 28 form cavities for the nuts 77. Cover 70 is separably secured by a further nut 78 that is threaded onto the threaded distal end of each fastener 76 and tightened to secure the cover and disc 66 in assembled relationship against disc 28 and in satisfactorily sealed manner to prevent intrusion of debris through the journal structure, thus, formed at this end of the strainer.

An elbow 80 is attached to the end of pipe 56 opposite cap 68. A further section of pipe 82 extends from elbow 80 radially through a suitable opening 84 in the sidewall of pipe 12, and it is through this radial pipe section 82 that water enters pipe section 56.

Journaling of filter screen assembly 14 on pipe 12 adjacent the location where pipe section 82 passes through the sidewall of pipe 12 is accomplished by a series of spaced apart circular wheels 84 disposed on the pair of discs 26, 30. The illustrated embodiment comprises six such wheels 84 at 60 degrees intervals on a common circle about axis 16. Each wheel is supported on the disc pair 26, 30 for rotation about an axis 86 that is parallel to axis 16, and set radially outwardly from the wall of pipe 12 in an amount substantially equal to the wheel's radius. In this way, each wheel essentially tangentially engages the outer wall of pipe 12.

The two discs 26, 30 have central circular clearance holes through which pipe 12 passes. The diameter of each of these holes is sufficiently greater than the O.D. of pipe 12, but sufficiently less than the radial distance of each axis 86 from axis 16 to provide adequate support for the wheels. The wheels are disposed on the interior of assembly 14 where they will be protected from debris.

In order to prevent intrusion of debris into the interior of assembly 14 through the annular gap that exists between pipe 12 and the disc pair 26, 30, an annular seal 100 is provided. This seal is a thin lip type seal element whose outer margin is held between a pair of retaining rings 102, 104, and whose inner margin is disposed in full sealing contact around the outside of pipe 12. The outer margin of the seal held by rings 102, 104, is generally transverse to axis 16 while the inner margin of the seal curves to terminate with a lip type surface contact around the full perimeter of tube 12. As filter screen assembly 14 rotates on pipe 12, the seal maintains full continuous contact with the wall of pipe 12 so that debris cannot intrude into the interior of the assembly through the gap between the end discs 26, 30 and pipe 12. By curving the lip outwardly away from the interior of assembly 14, attempted intrusion will only serve to urge the lip more forcefully against the pipe.

Rings 102, 104 have matching hole patterns in registry with a corresponding hole pattern through the disc pairs 26, 30. In the illustrated embodiment, there are twelve holes in the pattern uniformly spaced at 30 degrees intervals on a common circle about axis 16. Alternate ones of these holes are used both to fasten the two rings 102, 104 which sandwich the outer margin of seal element 100 to form an assembly of 100, 102, 104, and also to fasten the assembly, thus, formed to disc 30. For this purpose, the shanks of headed fasteners 106 are passed through these holes in ring 102 and ring 104. A first nut 105 is threaded onto the distal end of the fastener shank and tightened to secure the parts 100, 102, 104 in assembly. Disc 26 contains a cavity for each nut 105 while the shank further projects through a hole in disc 30. A second nut 108 is threaded onto the shank end and tightened against disc 30 to secure the assembled parts 100, 102, 104 on disc 30.

The remaining six holes of the twelve hole pattern register with the axis 86 of wheels 84. The parts which are used for mounting of each wheel on the disc pair 26, 30 comprise a head fastener 88 that has a threaded shank, a pair of washers 90, 92 and three nuts 94, 96, 98 assembled as illustrated. The nuts 96, 98 are tightened against opposite sides of the disc pair 30, 26. Nut 94 is tightened against nut 96. The two washers 90, 92 are spaced on opposite sides of the wheel, and the wheel has a slightly larger I.D. than the diameter of the shank of fastener 88. Nuts 94, 96 serve to space each wheel axially away from disc 30. Ring 104 contains a cavity for nut 98 that allows ring 104 to be disposed flat against disc 26 when the assembly consisting of parts 100, 102, 104 is attached to the end closure. The wheel freely rotates on the fastener shank without excessive radial or axial play.

Simultaneous rotation and cleaning of the screen assembly is produced by means of water sprays from two sets 110A, 110B of nozzles 110, four in each set which are spaced apart along the length of the screen. The two sets of nozzles are 180 degrees apart about axis 16. Each nozzle is at one end of a pipe 112 whose other end taps into pipe 56. In each set, these pipes 112 pass through spaced apart, but circumferentially aligned, circular holes in the wall of pipe 12. Each set of nozzles is aimed to impart both tangential and radially outward components of force to screen portion 22 over a corresponding limited circumferential zone relative to pipe 12, said zones being 180 degrees apart. Advantageously, the nozzles are of the type that in air direct a flat, wide, and uniform spray pattern such as schematically portrayed in FIG. 5. This is sufficient to cover substantially the full length of screen portion 22 along each limited circumferential zone even with the nozzles immersed in water as they are when the strainer is in use. Because the action of the nozzles occurs over only two limited circumferential extents of the screen at any given time, the pump suction force delivered through pipe 12 to intake 18 draws liquid through the remainder of the screen.

Each pipe 112 comprises a radial segment 116 having the inner end threaded into a tapped hole in the sidewall of pipe 56. Each segment 116 passes through a corresponding clearance hole in the wall of pipe 12. A shorter pipe 120 projects from a curved bend portion 118 so as to be disposed at 90 degrees to the radial segment 116. A nozzle 110 is at the end of this shorter pipe segment 120.

Since discharge portion 20 of pipe 12 is connected to the suction side of the pump when the strainer is in use, the suction force along the length of pipe 12 will progressively decrease along pipe 12 in the direction away from discharge portion 20. In order to promote a more uniform velocity of flow through screen 22 along its length, the intake openings of portion 18 are made progressively larger in size in the direction away from discharge portion 20.

In the illustrated embodiment, the intake portion comprises a series of circular holes through the sidewall of pipe 12. There are six axial rows 124 of holes, each containing four holes whose centers are approximately uniformly spaced apart along the length of pipe 12. The rows 124 are arranged 60 degrees apart from each other around the pipe. The four radial pipe segments 112 of set 110A pass through the four holes of one of the six rows, while those of the other set 110B pass through the four holes of the diametrically opposite row. With this arrangement, the six largest holes 126 are farthest away from the suction source, while the six smallest holes are closest to the suction source. The holes 130 and 132 lie between holes 126 and 128. By making the holes smaller, the closer they are to discharge portion 20, the net result is to more substantially equalize the flow volume entering pipe 12 at the different locations along the pipe's length. Correspondingly, a more uniform flow through the filter screen is created, thereby, minimizing the tendency of forming of "hot spots" in the screen.

When the strainer is in use submerged in water that is to be pumped, suction force is transmitted through pipe 12 to the filter screen assembly. Water is sucked through the filter screen assembly, passing into pipe 12 and, ultimately, to the pump. A tap at the pump outlet returns pressurized water through pipes 82 and 56 to both sets 110A, 110B. The nozzles 110 impart rotation to the filter screen assembly while dislodging any debris which may adhere to the outside of the screen as the screen revolves past the nozzles. The strainer 10 should be disposed in a suitable location in the body of water where interference with its rotation will not occur.

By providing the two sets 110A, 110B of nozzles 180 degrees apart, debris is dislodged from a given zone of screen portion 22 every half revolution of filter screen assembly 14, and this renders the strainer quite suitable for existing installations whose pump pressure would be insufficient to produce the most effective functioning of the strainer if the strainer has only a single nozzle set. Accordingly, the utility of a strainer like that of U.S. Pat. No. 4,822,486 is greatly enhanced by including a second nozzle set since the strainer can now be used in many installations where its full effectiveness might not, otherwise, be obtainable due to the comparatively lower pump pressures available for operating the strainer. The inventive principles are not, however, limited exclusively to embodiment in a strainer like the patented one.

A water source that contains particulate matter which is required to be filtered is a particularly challenging problem for a rotary self-cleaning strainer, especially when only comparatively low water pressures are available for operating the strainer. Screen portion 22 is constructed in such a way that it will operate successfully in such environments. The construction comprises an inner cylindrical screen of perforated metal sheet 22A that is girdled by a woven fine mesh wire screen 22B. Screen 22A has openings that are larger than the mesh of screen 22B. Screen 22A provides a reaction surface for the impacting nozzle sprays to rotate assembly 14, yet it allows the sprays to pass through and dislodge debris, including particulate material, that has accumulated on screen 22B.

FIGS. 6 and 7 depict an alternate construction for the framework of assembly 14. Circular rings 150 are arranged parallel to, and spaced between, the disc pairs 26, 30 and 28, 32. The rings join with the tie rod structures 34 and tubes 36, each tube 36 being split in this instance into several smaller tube sections. This design may be useful in providing a stronger frame.

The invention has been shown to provide further improvements in rotary self-cleaning strainers. While a presently preferred embodiment of the invention has been illustrated and described, it will be appreciated that principles are applicable to other equivalent embodiments.

What is claimed is:

1. In an existing irrigation network for cultivated land wherein water is sucked from a water- and debris-containing irrigation channel by a pump and forced at a prevailing pressure through the network to irrigate the land, the improvement which comprises a rotary self-cleaning strainer that can effectively operate at said prevailing pressure so that the inclusion of said strainer in the network does not require a pressure different from said prevailing pressure just to enable said strainer to be used in the network, said strainer being submerged in the channel and comprising a main cylindrical pipe having an intake and a discharge at spaced locations along its length, a cylindrical screen structure having an interior that is submerged in the channel for straining debris from the water, means for supporting and journaling said screen structure on and for coaxial rotation about said pipe in a manner that disposes said screen structure in outwardly spaced relationship to said intake for causing water entering the intake to have been strained by said screen structure, means comprising a supply pipe structure arranged to receive water returned from a pump and supply the returned water to the interior of said screen structure, and two sets of nozzles that are disposed within the interior of said screen structure and that are connected to said supply pipe structure for spraying the returned water against said screen structure to simultaneously rotate and clean the submerged screen structure while strained water is entering said intake, the pump sucking water from the channel via said strainer, one set of nozzles being circumferentially spaced from the other set so that said sets act upon circumferentially spaced apart zones of said screen structure that themselves have limited circumferential extents.

2. The improvement set forth in claim 1 in which said two sets of nozzles are spaced 180 degrees apart circumferentially about a rotational axis of said screen structure.

3. The improvement set forth in claim 1 in which said screen structure comprises a perforated metal cylindrical sheet that is girdled by a fine mesh woven screen.

4. The improvement set forth in claim 3 in which said means for supporting and journaling said screen on and for coaxial rotation about said pipe comprises a frame having disc structures at opposite axial ends, tie rod structures joining said disc structures with each other, and one or more rings disposed parallel with and spaced between said disc structures and joining with said tie rod structures.

5. The improvement set forth in claim 4 in which each of said tie rod structures comprises a tie rod extending through a series of individual aligned tubes that axially separate said disc structures and said rings.

6. A self-cleaning strainer for connection to a pump and immersion in debris-containing liquid to prevent debris in the liquid from being sucked along with liquid into the pump, said strainer comprising a main cylindrical pipe having a length, and an intake and a discharge at spaced locations along its length, said discharge serving to communicate the pipe to the pump and said intake serving to communicate the pipe to the liquid, a cylindrical screen for straining the debris from the liquid, means for supporting and journaling said screen on and for coaxial rotation about said pipe in a manner that disposes said screen in outwardly spaced relation to said pipe and in surrounding relation to said intake for causing liquid entering the intake to have been strained by said screen, nozzle structure interior of said screen and directed toward said screen for emitting fluid through a limited area of said screen, in which said intake comprises openings through a sidewall of said main pipe, said openings being spaced apart axially along said main pipe and said openings being progressively larger in size as their respective distances along the length of said main pipe from said discharge increase, said nozzle structure comprising two sets of nozzles that are circumferentially spaced apart so as to act upon circumferentially spaced apart zones of said screen which are of limited circumferential extent.

7. A self-cleaning strainer as set forth in claim 6 in which said screen comprises a perforated metal sheet that is girdled by a woven mesh screen.

8. A self-cleaning strainer for connection to a pump and immersion in debris-containing liquid to prevent debris in the liquid from being sucked along with liquid into the pump, said strainer comprising a main cylindrical pipe having a length, and an intake and a discharge at spaced locations along its length, said discharge serving to communicate said pipe to the pump and said intake serving to communicate the pipe to the liquid, a cylindrical screen for straining the debris from the liquid, means for supporting and journaling said screen on and for coaxial rotation about said pipe in a manner that disposes said screen in outwardly spaced relation to said pipe and in surrounding relation to said intake for causing liquid entering the intake to have been strained by said screen, a supply pipe extending axially through said main pipe, one or more apertures through a sidewall of said main pipe, one or more pipe structures tapped into said supply pipe, extending through said one or more apertures, and terminating in nozzles directed toward said screen for both cleaning and rotating the screen by a fluid that is fed through said supply pipe and said pipe structures and emitted at said nozzles, in which said intake comprises openings through the sidewall of said main pipe, said openings being spaced apart axially along said main pipe and said openings being progressively larger in size as their respective distances along the length of said main pipe from said discharge increase, and said nozzles being in two sets that are 180 degrees apart from each other.

9. A self-cleaning strainer as set forth in claim 8 in which said openings comprise a pattern of circular holes arranged in axial rows that are circumferentially spaced around said main pipe.

10. A self-cleaning strainer as set forth in claim 9 in which said one or more apertures comprise plural apertures arranged in axial rows which are parallel to the axial rows of holes.

* * * * *